Figure 1A:
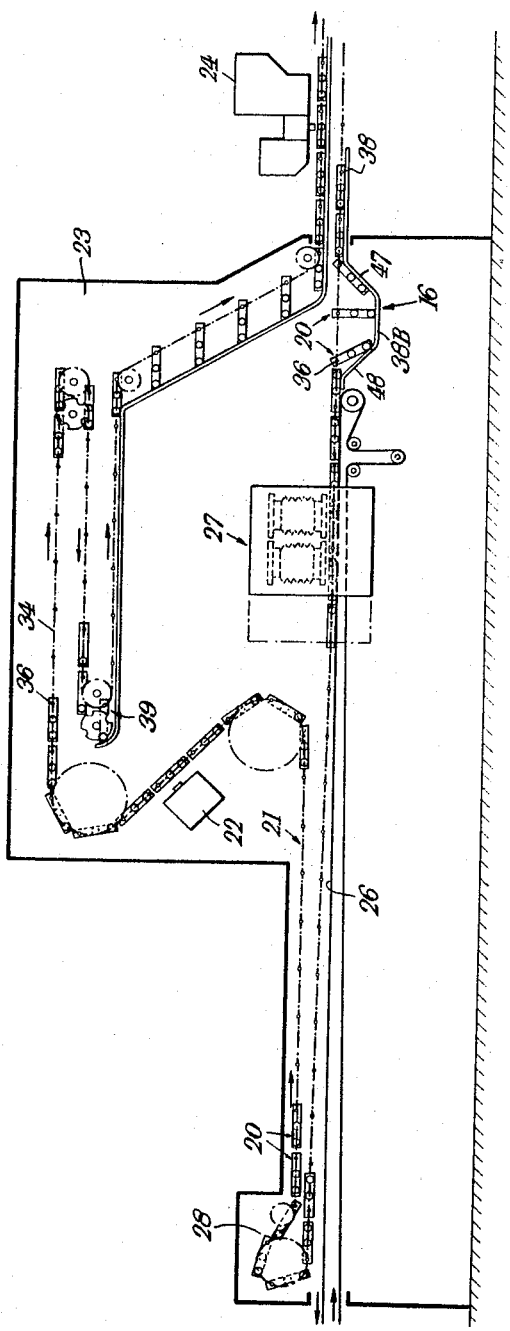

May 9, 1967 M. S. JEFFERY 3,318,263
MANUFACTURE OF CONFECTIONERY
Filed Dec. 7, 1964 8 Sheets-Sheet 1

INVENTOR
Maurice S. Jeffery
By Watson, Cole, Grindle & Watson
ATTORNEYS

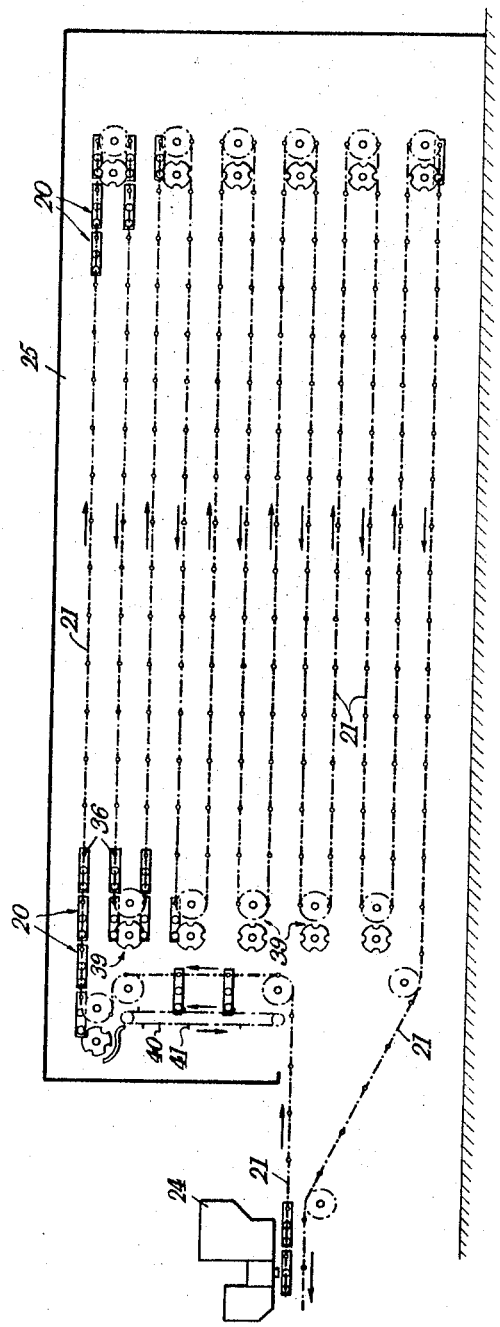

May 9, 1967 M. S. JEFFERY 3,318,263
MANUFACTURE OF CONFECTIONERY
Filed Dec. 7, 1964 8 Sheets-Sheet 3

May 9, 1967 M. S. JEFFERY 3,318,263
MANUFACTURE OF CONFECTIONERY
Filed Dec. 7, 1964 8 Sheets-Sheet 5

INVENTOR
Maurice S. Jeffery
By Watson, Cole, Grindle & Watson
ATTORNEYS

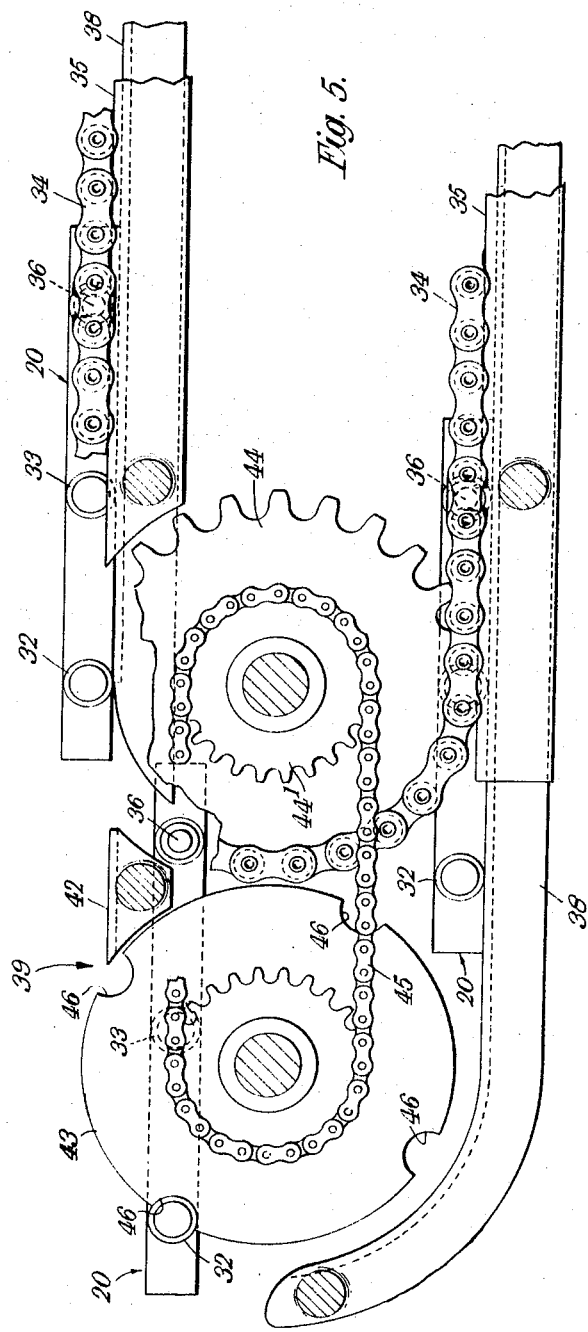

May 9, 1967  M. S. JEFFERY  3,318,263
MANUFACTURE OF CONFECTIONERY
Filed Dec. 7, 1964  8 Sheets-Sheet 7
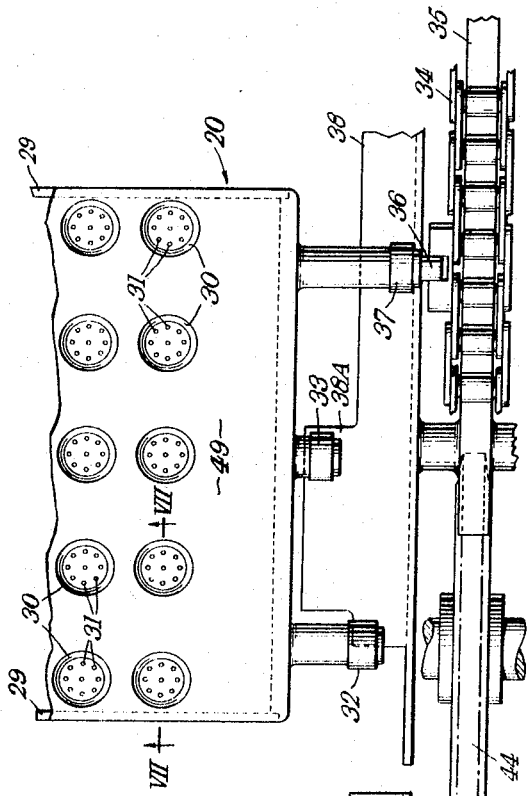
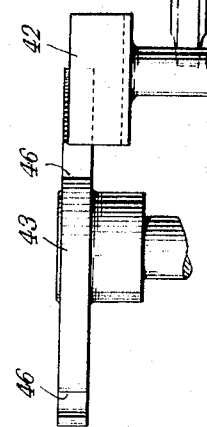
Fig. 6.
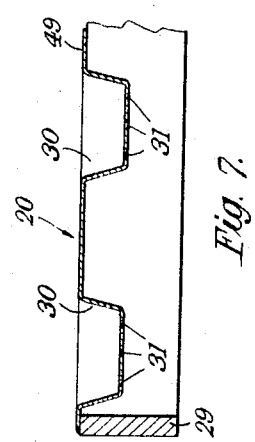
Fig. 7.
INVENTOR
Maurice S. Jeffery
By Watson, Cole, Grindle & Watson
ATTORNEYS May 9, 1967   M. S. JEFFERY   3,318,263
MANUFACTURE OF CONFECTIONERY
Filed Dec. 7, 1964   8 Sheets-Sheet 8

INVENTOR
Maurice S. Jeffery
By Watson, Cole, Grindle & Watson
ATTORNEYS

United States Patent Office 3,318,263
Patented May 9, 1967

3,318,263
MANUFACTURE OF CONFECTIONERY
Maurice Stanley Jeffery, Solihull, England, assignor to Baker Perkins Limited, Peterborough, England, a company of Great Britain
Filed Dec. 7, 1964, Ser. No. 416,536
4 Claims. (Cl. 107—8)

Confectionery of the soft fondant type, such for example as centers for chocolates, is normally manufactured by forming cavities in a mass of starch contained in a tray, depositing the confectionery in the cavities so formed, allowing the tray to stand until the moulded soft fondants have cooled sufficiently to form a skin which will withstand brushing, subsequently turning over the tray and separating the fondants to free them from adhering starch prior to their passage through an enrober. Other confections which are normally cast in starch include marshmallow, Turkish delight, fudge and jellies.

Moulding in starch has been mechanized so that it can be operated continuously but it suffers from the disadvantages that the large quantities of starch released into the atmosphere create an explosion hazard and that the trays require to be removed from the conveyor system which traverses them through the machine, stood to cool for a long period and thereafter returned to the conveyor system for knocking out and refilling. This involves considerable manual handling of the trays.

Hard fondants, e.g. peppermint creams, can be cast in starchless rubber moulds which are traversed continuously through a machine without removal from its conveyor system, the cooled fondants being ejected from the moulds by deforming them. This procedure has hitherto been inapplicable to soft fondants and the other confections mentioned above because of the tendency of the confectionery to adhere to the moulds and the fact that the moulded products are insufficiently robust to permit of them being ejected mechanically from the moulds, even if the moulds are split and deformable.

The present invention is based upon my discovery that soft fondants and other confections normally cast in starch, can be successfully moulded in starchless moulds by providing minute holes in the base of each mould cavity, introducing a small quantity of a suitable release agent into each mould cavity and ejecting the cooled confectionery from the inverted mould by blowing air through the holes, provided that the holes are so minute that the confectionery will not penetrate them and a group of holes is provided in each mould and so disposed that, during ejection, the air pressure is distributed over a substantial area of the surface of the confectionery. It is not satisfactory to provide a single hole in each mould, since the air pressure is then concentrated on a small area of each confection and there is a risk of the thin solidified skin of the confection becoming pierced and allowing the softer central portion to become exposed and cause sticking in the mould.

Generally speaking, the diameter of the holes should not substantially exceed 0.020" and I have successfully used holes of diameter 0.016" with soft fondant. In the case of a cup mould, the holes may be disposed in a ring in the base of the cup and a further hole may be provided at the center of the ring. In the case of a hemispherical mould, I may use a single central hole and a surrounding ring of holes at a slightly higher level. In the case of a mould having a flat base and producing fondant of approximately half-moon shape, I may provide eight holes more or less uniformly disposed in the base of the mould.

The confectionery is normally introduced into the mould at a temperature of 140°–220° F., the mould then being chilled to a temperature of the order of 70° F. I prefer to use as the release agent a liquid fat product which has a setting point below 70° F., e.g. a liquid fat product acceptable for use with food products and having a setting point of 40° F. A minute amount of release agent is used. Thus in the case of a mould having 90 mould cavities, each of capacity 6 cc., it is only necessary to spray 1½ cc. of such liquid release agent into the mould. It is also possible to use magnesium stearate as the release agent, and this is dusted into the mould in powder form. Magnesium stearate is not, however, suitable for use with pectin jellies, because it reacts chemically with the pectin.

The invention includes a method for the manufacture of soft fondants and like confections which consists in traversing a series of moulds by a conveyor past a station at which a small quantity of release agent is introduced into the mould cavities, each of which has in its bottom minute holes as described above, then past a filling station at which the mould cavities are filled with the confection, then through a cooling zone, and then inverting the moulds and discharging the moulded confections by application of air under pressure to the holes. The moulds can either be fixed into a conveyor circuit or be of the loose mould type and easily removable.

Preferably the confections are discharged from the moulds on to a conveyor band so that they are deposited in a regular pattern on the band. The moulds afterwards lift from the band which carries the confections on to an enrober, a device for applying sugar to the exterior surfaces of the confections, a packing station or other desired destination.

The moulds must, of course, be of a material which will withstand the temperature at which the mould cavities are filled and which is not subject to chemical action by the confectionery. Thus they may be rigid or flexible. Rigid moulds may be made from metal stampings or injection moulded Delrin material. Flexible moulds may be made from rubber or vacuum formed polypropylene.

Figure 2:
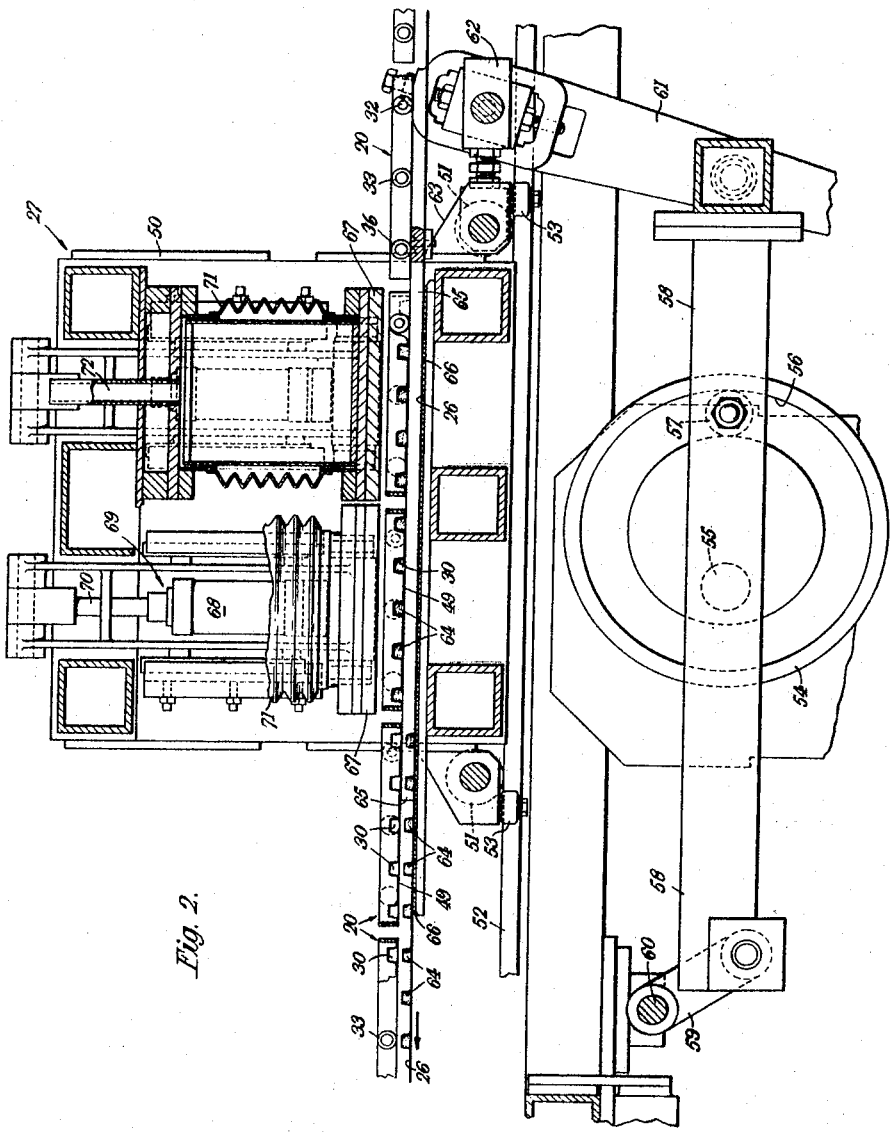
Figure 3:
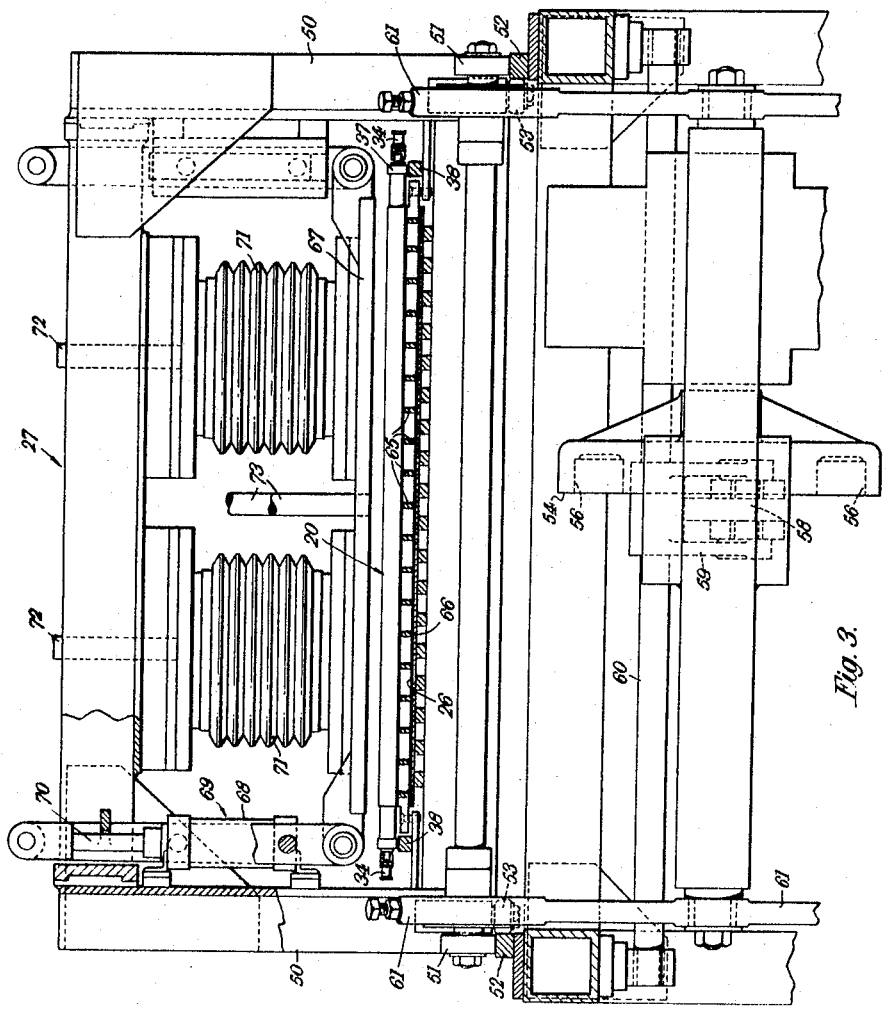
Figure 4:
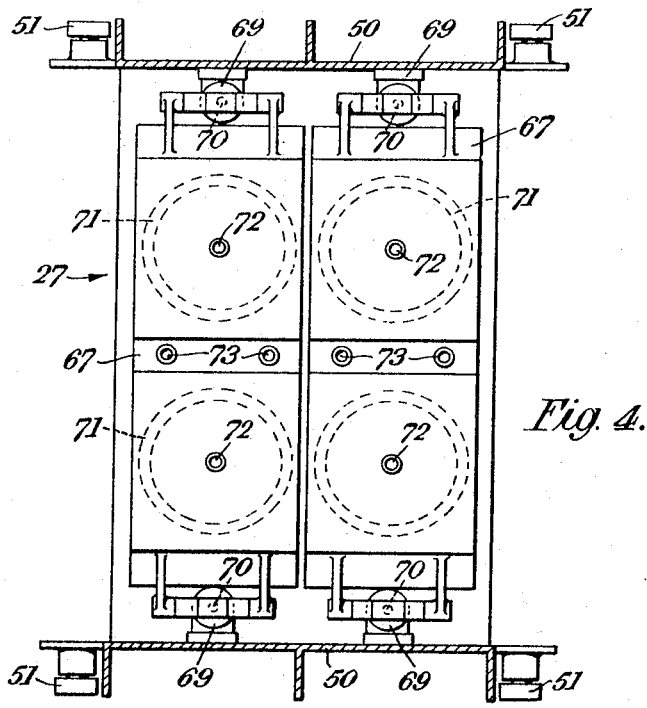
Figure 8C:
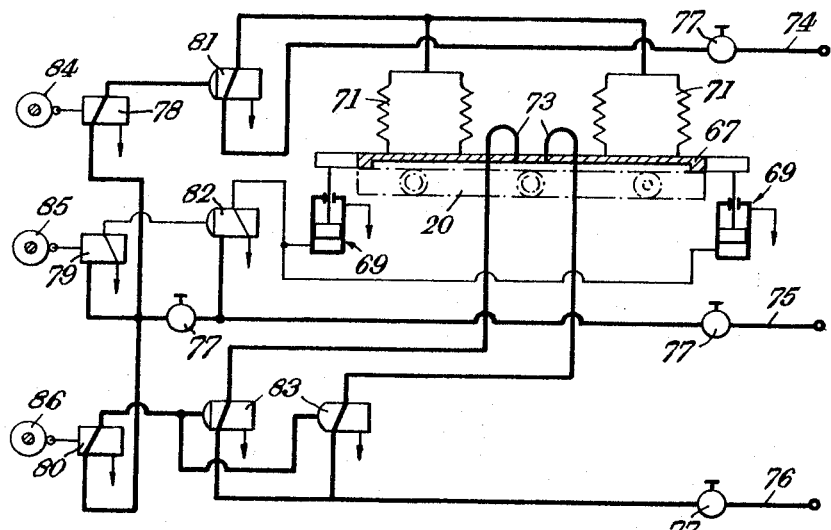
Figure 8A:
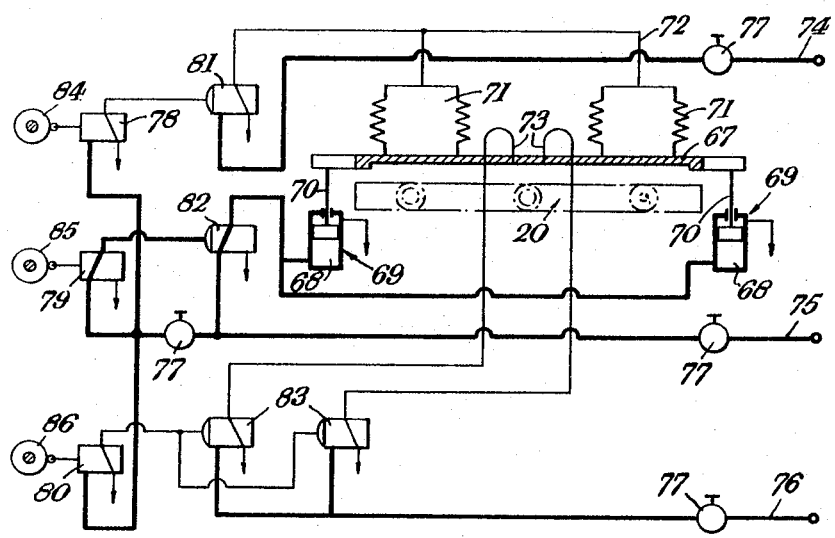
Figure 8B:
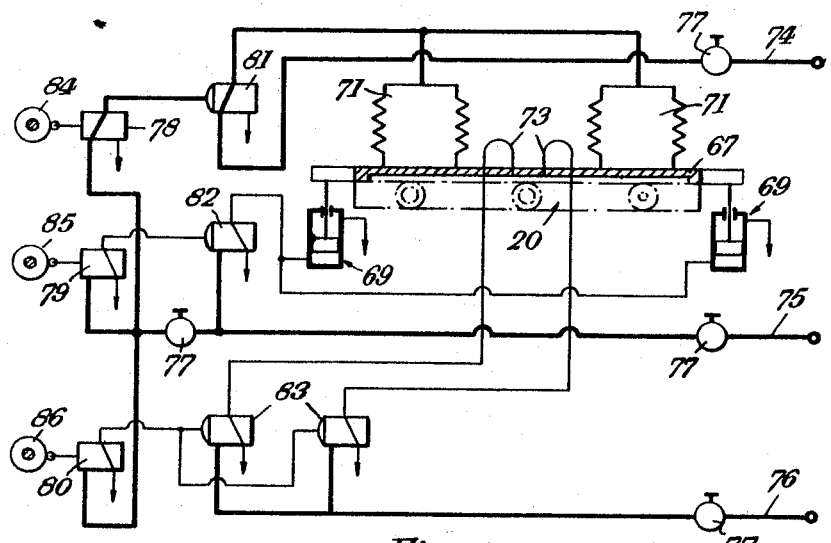

One form of apparatus according to the invention for the moulding of soft fondant will now be described in detail, by way of example, with reference to the accompanying drawings in which:

FIGS. 1A and 1B collectively show the apparatus diagrammatically and in side elevation, FIG. 2 is a side elevation, partly in section, on a larger scale of the demoulding unit, FIG. 3 is a view looking from the right hand side of FIG. 2, FIG. 4 is a diagrammatic plan view of the demoulding unit on a smaller scale, FIG. 5 is a side elevation of a mould reversing unit, FIG. 6 is a corresponding plan view, FIG. 7 is a section on the line VII—VII in FIG. 6 on a larger scale, and FIGS. 8A, 8B and 8C are diagrams showing a pneumatic control system for the demoulding unit.

Like referenue numerals indicate like parts throughout the figures.

As shown in FIGS. 1A and 1B, moulds 20 are traversed through the apparatus in a continuous procession by a chain conveyor 21. The moulds are first traversed in succession through a control zone 23, in which the moulds may be heated or cooled if required. During passage through the control zone a liquid release agent, of the kind referred to above, is sprayed into the moulds by a spray head 22 of conventional construction. The moulds then pass beneath a moving head depositor 24 of known type, for instance that described in British Patent No. 405,374, which moves alternately forwardly with the moulds and then back again to fill all the cavities in each mould with soft fondant. The moulds then pass through a cooling unit 25, consisting of superposed horizontal runs totalling some 200 feet in length. The moulds, cooled to some 70° F., pass from the cooling unit 25 along a run, beneath and in the opposite direction to their run under the depositor 24, to a turnover unit 16. The inverted moulds leaving the turnover unit 16 travel over a conveyor band 26, disposed beneath the moulds, upon which the fondants are discharged from the moulds by a demoulding unit 27 as later explained. The chain conveyor 21 then diverges from the band 26 and carries the moulds through a second turnover unit 28, of the construction described in British Patent No. 1,005,674, which turns the moulds into their original position in which their cavities face upwardly, and from this unit the moulds travel back to the control zone 23 to commence a fresh circuit through the apparatus. The band 26 conveys the fondants to an enrober.

As shown in FIGS. 5–7, each mould 20 is mounted on an open frame 29 and is formed with a number of rows and columns of cavities 30 into which fondant is delivered by the depositor 24. In the base of each cavity are nine minute holes 31, one hole being at the center of the cavity and the other holes being arranged in a ring surrounding the central hole. The mould carrier, indicated diagrammatically at 21 in FIG. 1A, consists of two parallel chains 34, disposed at opposite sides of the moulds and running on supporting rails 35. Each frame 29 is pivoted to each of the chains 34 by a pin 36, and carries at each side a pair of rollers 32, 37, which run on a supporting rail 38, and also a third roller 33.

As shown in FIGS. 1A and 1B, the moulds 20 enter the control zone 23 and the cooling unit 25 with their pins 36 leading. On succesive passes through the control zone and the cooling unit the moulds are reversed, by reversing units 39 so that the pins 36 lead and trail at alternate passes, thus keeping the moulds at all passes in a position in which their cavities face upwardly. The moulds are lifted in succession to the top pass of the cooling unit 25 by a conveyor 40 (FIG. 1B) having flights 41 which engage beneath the ends of the moulds. The conveyor 40 is of conventional construction, its flights 41 lifting the moulds in succession to the higher level as is apparent from FIG. 1B.

A reversing unit 39 for use in reversing the moulds from a pin-trailing to a pin-leading position is shown in FIGS. 5 and 6. A disc 43 at each side of the mould conveyor is driven from a chain sprocket 44¹ of the mould conveyor by a chain drive 45. The disc 43, which has a diameter equal to that of the circle tangent to the outer extremities of the teeth of the sprocket 44, has four diametrically opposite recesses 46. As shown in FIG. 6 these recesses engage the rollers 32 on successive mould assemblies as they pass around the sprockets 44 to maintain the moulds horizontal, the rollers 32 on the moulds being supported by pads 42 and the rollers 33 being supported by extensions 38A of the roller support rails 38 as the moulds pass over the sprocket 44.

As shown in FIG. 1A, the moulds approach the turnover unit 16 with their pins 36 trailing. As the rollers on the moulds pass into troughs 38B in the roller support rails 38, the moulds are inclined by the first side 47 of each trough and ultimately caused to assume a position in which they hang vertically. They are then reversely inclined by the second side 48 of the trough so that they pass horizontally beneath the demoulding unit 27 with the pins 36 leading and their cavities 30 facing downwardly.

As shown in FIGS. 2–4, the demoulding unit 27 includes a carriage 50, having at each side rollers 51 which run on rails 52 and guide rollers 53 which run on the inwardly facing surfaces of the rails 52. The carriage 50 is reciprocated by a cam 54 mounted on a driving shaft 55. The cam 54 is formed with a track 56 which engages a roller 57 carried by a lever 58 which is pivoted at its left hand end (as seen in FIG. 2) to a link 59, which can rock on a fixed pin 60, and at its right hand end to along lever 61. The lower end of the lever 61 is mounted on a fixed pivot (not shown) and its upper end is connected by a linkage 62 to a bracket 63 on the carriage 50. As the mould conveyor moves forward to the extent required to traverse two moulds past a given datum point, the carriage 50 is moved forwardly through half this distance and then back again. During the forward travel of the carriage, the fondants 64 are discharge pneumatically from the cavities in a pair of moulds on to the conveyor band 26 as will now be described, and during such discharge of the fondants the carriage 50 travels forward at the same speed as the moulds. Mounted at the lower end of the carriage are a series of longitudinal comb bars 65, which extend between the inverted moulds 20 and the band 26, and a plate 66 which supports the undersurfaces of the band 26.

The carriage 50 carries a pair of pressure plates 67, each of which is attached at its opposite ends to the cylinder 68 of a pneumatic jack 69, the piston rods 70 of which are attached to the upper end of the carriage. When air is admitted to the jacks 69, the pressure plates 67 are raised clear of the moulds, as shown in FIGS. 2 and 3, but when the air pressure is relieved, the pressure plates descend by gravity into contact with the moulds. A pair of bellows 71 is provided on top of each pressure plate, and each bellows has at its upper end an air inlet pipe 72. Air inlet pipes 73 are provided at the upper face of each pressure plate, and each pipe 73 communicates directly with a cavity (not shown) in the undersurface of the pressure plate 67.

In operation, as the carriage travels forwards from the position shown in FIG. 2, air is evacuated from the jacks 69, causing the pressure plates 67 to descend into contact with the undersurfaces of the moulds 20 and air under pressure is supplied through the pipes 72 to the bellows 71, so bringing the pressure plates 67 into sealing engagement with the undersurfaces of the moulds and pressing the moulds against the comb bars 65 as shown in FIG. 3 and compressed air is then supplied through the pipes 73 into the cavities in the moulds to eject the fondants 64 which fall between the comb bars 65 on to the conveyor band 26, the comb bars 65 guiding the fondants so that they are deposited on the band in columns and rows corresponding to the arrangement of the cavities 30 in the moulds. After discharge of the fondants the moulds diverge gradually from the band 26.

The pneumatic control system for the demoulding unit is shown in FIGS. 8A, 8B and 8C. In these figures pressure lines are shown by thick lines and exhaust lines by thin lines. The system includes three pressure lines 74, 75, 76 which respectively supply air under pressure of 80 p.s.i., 65 p.s.i. and 30 p.s.i, a number of pressure regulating valves 77, pilot valves 78, 79, 80, diaphragm valves 81, 82, 83 and cams 84, 85, 86.

At the start of a cycle, the system is in the condition shown in FIG. 8A, pressure air being cut off from the bellows 71 and from the pressure plates 67, but supplied from the line 75 and the diaphragm valve 82 to the jacks 69 so that the pressure plates 67 are raised from the moulds.

As the pressure plates and the moulds travel forward from the position shown in FIG. 2, the cams 84, 85 actuate the pilot valves 78, 79, which respectively actuate the diaphragm valves 81, 82, as shown in FIG. 8B, to exhaust air from the jacks 69 through the valve 82, with the result that the pressure plates 67 descend by gravity on to the moulds 20, and to permit the flow of compressed air from the line 74 through the valve 81 to the bellows 71 to press the pressure plates into sealing engagement with the moulds. As is apparent from FIG. 2, each bellows 71 is attached at its upper end to an upper cross member of the carriage 50 and at its lower end to the pressure plate 67. Application of internal air pressure to the bellows, after the pressure plate has descended by gravity on to the moulds, presses the pressure plate into firm sealing engagement with the moulds beneath it. Each bellows contains a canister, visible in FIG. 2, for limiting the quantity of air required to apply sealing pressure to the plate 67.

The cam 86 then actuates the pilot valve 80 to reverse the position of the diaphragm valves 83, so causing air from the line 76 to be supplied to the interior of the moulds to discharge the fondants, as indicated in FIG. 8C.

After a period of approximately 1½ seconds, the cam 86 returns the pilot valve 80 to the position of FIG. 8B, with the result that air is exhausted from the interior of the moulds through the valves 83. The cams 84 and 85 then return the pilot valves 78, 79 to the position of FIG. 8A, causing air to be exhausted from the bellows 71 through the valve 81 and air to be reapplied to the jacks 69 through the valve 82 to raise the pressure plates from the moulds.

What I claim as my invention and desire to secure by Letters Patent is:

1. In apparatus for moulding confectionery comprising a chain conveyor for advancing moulds, each having a plurality of mould cavities extending in columns and rows and with minute holes in their bases, in continuous procession to a filling station and thence through a cooling zone to a discharge station past which the moulds travel in inverted position, a demoulding unit comprising, in combination with said chain conveyor and the moulds carried thereby, a band conveyor which travels beneath the chain conveyor at the discharge station, a carriage at the discharge station, means for reciprocating the carriage to perform forward strokes alternating with return strokes, a pressure plate on the carriage of area sufficient to cover a mould, a mould support mounted on the carriage and disposed between the moulds and the band conveyor and formed with openings permitting of downward discharge of confectionery from the mould cavities on to the band conveyor, means for moving the pressure plate downwardly on each forward stroke of the carriage into sealing engagement with a mould beneath it, thereby pressing said mould against said mould support, and subsequently raising the pressure plate from the mould, and means for blowing air through the pressure plate while in sealing contact with the mould to discharge the confectionery from all of the cavities in the mould on to the band conveyor.

2. In apparatus for moulding confectionery, a combination as claimed in claim 1, comprising pneumatic jacks supporting the pressure plate on the carriage, the pressure plate being arranged to move by gravity to engage a mould beneath it upon release of air pressure within the jacks, a bellows positioned above the pressure plate and means for introducing air under pressure into the bellows to press the pressure plate into sealing engagement with the mould prior to blowing of air under pressure through the pressure plate.

3. In apparatus for moulding confectionery, a combination as claimed in claim 1, wherein said chain conveyor is arranged to diverge gradually from the band conveyor as it leaves the discharge station.

4. In apparatus for moulding confectionery, a combination as claimed in claim 1, wherein said mould support is constituted by a series of spaced comb bars extending in the direction of travel of the chain conveyor.

References Cited by the Examiner

UNITED STATES PATENTS

| 1,839,731 | 1/1932 | Baum | 107—8 |
| 2,240,214 | 4/1941 | Heidelmeyer et al. | 107—8 |

WALTER A. SCHEEL, *Primary Examiner.*

J. SHEA, *Assistant Examiner.*